United States Patent
Joudareff et al.

(10) Patent No.: US 10,641,183 B2
(45) Date of Patent: May 5, 2020

(54) BUTTERFLY VALVE FOR BLEEDING A COMPRESSOR FOR AN AIRCRAFT TURBINE ENGINE

(71) Applicant: Safran Aircraft Engines, Paris (FR)

(72) Inventors: Arnaud Joudareff, Maisons Alfort (FR); Pierre Charles Mouton, Grigny (FR); Bellal Waissi, Vert Saint Denis (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 177 days.

(21) Appl. No.: 15/572,953

(22) PCT Filed: May 11, 2016

(86) PCT No.: PCT/FR2016/051101
§ 371 (c)(1),
(2) Date: Nov. 9, 2017

(87) PCT Pub. No.: WO2016/181069
PCT Pub. Date: Nov. 17, 2016

(65) Prior Publication Data
US 2018/0142626 A1    May 24, 2018

(30) Foreign Application Priority Data
May 13, 2015   (FR) ...................................... 15 54301

(51) Int. Cl.
*F02C 9/18* (2006.01)
*F04D 27/02* (2006.01)
*F02C 6/08* (2006.01)

(52) U.S. Cl.
CPC .................. *F02C 9/18* (2013.01); *F02C 6/08* (2013.01); *F04D 27/0215* (2013.01)

(58) Field of Classification Search
CPC ........... F02C 9/18; F02C 6/08; F04D 27/0215
See application file for complete search history.

(56) References Cited

U.S. PATENT DOCUMENTS 2,299,865 A  * 10/1942  Whitted ............... B64D 37/005
                                                    251/279
3,572,632 A  *  3/1971  Bengtsson ................ F16K 1/22
                                                    251/306

(Continued)

FOREIGN PATENT DOCUMENTS

| CN | 2918758 Y | 7/2007 |
| EP | 0 190 943 A2 | 8/1986 |
| FR | 2 823 532 A1 | 10/2002 |

OTHER PUBLICATIONS

Search Report issued in French Patent Application No. 1554301 dated Mar. 3, 2016.

(Continued)

*Primary Examiner* — Eric Keasel
(74) *Attorney, Agent, or Firm* — Pearne & Gordon LLP (57) ABSTRACT

The invention relates to a butterfly valve (24) for bleeding a compressor for an aircraft turbine engine, the valve including a valve body (32), a butterfly (36), and a device (42) for controlling the angular position of the butterfly, the device (42) including a mobile actuation member (64) connected to the butterfly by a link (70), the member (64) being subjected: to a first adjustable pressure force (F1) applied by air from the compressor, the first force (F1) returning the butterfly (36) to a closed position; and to a second mechanical force (F2) returning the butterfly (36) to an open position, and coming from an aerodynamic torque (C) applied by the air to the butterfly (36), of which the axis of rotation (38) is off-centre relative to the butterfly.

10 Claims, 4 Drawing Sheets

(56) References Cited

U.S. PATENT DOCUMENTS

| | | | | |
|---|---|---|---|---|
| 4,436,281 | A | * | 3/1984 | Chiron .................... F16K 1/226 251/305 |
| 4,617,958 | A | * | 10/1986 | Seidel .................. G05D 16/163 137/488 |
| 6,283,448 | B1 | * | 9/2001 | Denton ..................... F16K 1/22 251/308 |
| 6,694,746 | B2 | * | 2/2004 | Reed ....................... F02C 7/047 137/488 |
| 8,210,201 | B2 | * | 7/2012 | Fowler ................... F16K 35/02 137/489.5 |
| 8,286,661 | B2 | * | 10/2012 | Krake ................ F16K 31/1245 137/487 |
| 9,341,280 | B2 | * | 5/2016 | Pirat ................... F16K 31/1245 |
| 2002/0148216 | A1 | | 10/2002 | Brault |
| 2009/0229682 | A1 | | 9/2009 | Fowler |
| 2009/0261279 | A1 | | 10/2009 | Tanner |
| 2009/0321667 | A1 | * | 12/2009 | McCollum ............... F02C 6/08 251/61 |
| 2017/0044986 | A1 | | 2/2017 | Vertenoeuil |

OTHER PUBLICATIONS

International Search Report issued in Application No. PCT/FR2016/051101 dated Aug. 10, 2016.

Written Opinion issued in Application No. PCT/FR2016/051101 dated Aug. 10, 2016.

* cited by examiner

BUTTERFLY VALVE FOR BLEEDING A COMPRESSOR FOR AN AIRCRAFT TURBINE ENGINE

FIELD OF THE INVENTION

The present invention relates to the field of aircraft turbine engines, and more particularly to valves for bleeding a compressor fitted in such a turbine engine.

The term bleeding an aircraft turbine engine compressor denotes momentarily diverting a portion of the air flow passing through the compressor, for example towards an air stream external to the compressor, so as to limit the mass flow rate of the air supplied by the compressor. In this regard, it is noted that a pressure bleed relates to a scenario where the bleed has the side-effect of reducing the air pressure in the compressor, but as a general rule, the bleed first of all has the effect of limiting or reducing the mass flow rate of the air at the outlet of said compressor.

The invention applies in particular to turboprops, but also to other types of aircraft turbine engines such as turbojets, preferably double-flow and double-body.

STATE OF THE RELATED ART

In aircraft turbine engines, it is known to install compressor bleeding systems in order to maintain stable operation in steady and transient state. Indeed, under certain flight conditions such as for example the aircraft descent phase, the quantity of air supplied by the low or high-pressure compressor, i.e. the mass flow rate of the air supplied by the compressor, may be too high to ensure satisfactory operation of the turbine engine. Beyond a certain air flow rate, instabilities such as separations appear at the compressor blades having the effect of inducing surging and possibly inverting the direction of air flow in the compressor. Compressor bleeding systems thereby make it possible to discharge a portion of the air passing through the compressor, to prevent the various surging and separation phenomena of fluid filaments along the compressor blades. Such a compressor bleeding system is for example known from the document FR 2 823 532.

From the prior art, it is particularly known to use butterfly valves for bleeding a compressor. To this end, each valve comprises a valve body defining a channel through which the air from the compressor is intended to enter, as well as a butterfly rotatably mounted inside the channel, along an axis of butterfly rotation passing diametrically therethrough. The valve further comprises a device for controlling the angular position of the butterfly, this device being equipped with a mobile actuation member connected to the butterfly by linking means.

In a first known design of the prior art, the actuation member is a dual-acting piston wherein the large face is subjected to a first adjustable pressure force, applied by air extracted in the channel of the valve body. The small face of the piston is for its part subjected to a second pressure force from air likewise extracted in the channel, but wherein the pressure value remains identical to that of the air transiting via the compressor. This second force thereby exhibits no adjustability, unlike the first pressure force, the adjustment whereof makes it possible to actuate the piston in one direction or in the other, resulting in opening or closure of the butterfly. More specifically, the butterfly is opened by increasing the intensity of the first pressure force, whereas the closure thereof is induced by reducing said first pressure force. The intensity of the first pressure force is adjusted via a valve control system, usually FADEC (acronym of "Full Authority Digital Engine Control"). The control system is capable of outputting an electrical signal to a pressure reducer designed to vary the intensity of the pressure of the first pressure force, in response to the electrical signal received.

However, this first design has a number of drawbacks including significant frictions observed within the valve, as well as the compressibility of the air in the cylinder housing the dual-acting piston. These drawbacks, particularly air compressibility, induce non-linear phenomena impeding the response stability of the control device.

For an optimal resolution of the problems cited above, a second butterfly valve design has been proposed wherein the control member is replaced by a single-acting piston, wherein the large face is again subjected to the first adjustable pressure force. On the other hand, the second force is mechanical and produced by a spring wherein the return force opposes the first pressure force. In this second design, the butterfly is opened by releasing the first pressure force, via the pressure reducer. In this case, the return force of the spring surmounts the first pressure force and causes the actuation member to move in the direction inducing opening of the butterfly.

The second mechanical force deployed by the spring is as such dependent on the position of the butterfly, since it increases as the butterfly approaches the closed position thereof. This second design is advantageous because, not only does it make it possible to do away with most of the problems associated with the compressibility of the air in the cylinder and the problems associated with environmental conditions (pressure at altitude in question), but also in that the linear velocity of the actuation member is no longer constant, but dependent on the angular position of the butterfly. This advantageously results in an improvement in the response speed and stability of the control device.

However, this second butterfly valve design can still be improved, for the following reasons. First of all, the response speed of the control device remains affected by the aerodynamic torque applied by the air onto the butterfly, and which impedes the opening thereof. Furthermore, the spring is designed to supply a second mechanical force adapted to a restricted range of pressure values of the first pressure force. Outside this range of values, the second mechanical force may prove to be too high or too low, and thereby impede the response speed and stability of the control device. This proves to be problematic since the pressure within the compressor is liable to vary in large proportions, sometimes by up to a factor of fifty. This pressure in the compressor stream having a direct impact on the intensity of the first pressure force, operating scenarios may thereby arise wherein the design of the spring proves to be unsuitable for supplying a second mechanical force with a suitable intensity.

DESCRIPTION OF THE INVENTION

The aim of the invention is that of at least partially remedying the drawbacks mentioned above, relative to the embodiments of the prior art.

For this purpose, the invention relates to a butterfly valve for bleeding a compressor for an aircraft turbine engine, the valve comprising a valve body defining a channel through which the air from the compressor is intended to enter, a butterfly rotatably mounted inside the channel about an axis of butterfly rotation, as well as a device for controlling the angular position of the butterfly, the control device comprising a mobile actuation member connected to the butterfly by linking means, the actuation member being designed to be subjected:

to a first adjustable pressure force applied by air from the compressor, for example extracted directly in the primary stream of the compressor or possibly in said channel, the first adjustable pressure force returning the butterfly to a closed position; and to a second mechanical force returning the butterfly to an open position.

According to the invention, the axis of rotation is off-centre relative to a median segment of said butterfly such that the air in the channel generates an aerodynamic torque on said butterfly, said aerodynamic torque inducing, via the linking means, said second mechanical force on the actuation member.

In other words, the second mechanical force is no longer supplied by a spring as in the second design of the prior art, but originates directly from the aerodynamic torque applied by the butterfly in the valve channel. Due to the off-centring of the axis of rotation of the butterfly, the aerodynamic torque applied on the butterfly is also proportional to the opening angle of said butterfly, in that it increases as the butterfly approaches the closed position thereof. Consequently, the second mechanical force induced by this aerodynamic force also retains a progressive nature, as with the spring according to the prior art. However, as the aerodynamic torque is directly dependent on the air pressure in the channel of the valve body, the resulting second mechanical force is found to be advantageously adapted to the first pressure force also dependent on the air pressure in the compressor stream. The invention thereby makes it possible to provide the valve with an enhanced speed, i.e. a reduced response time throughout the operating range of the turbine engine, and therefore throughout the actuation range of the bleed valve and more particularly during an operation for opening said valve.

Moreover, in the event of an air pressure surge arising in the channel, the aerodynamic torque may induce an extremely rapid partial opening of the butterfly, by compressing the air providing the first pressure force. Indeed, the compressibility of the air is in this case used judiciously to bleed the compressor rapidly, and thereby anticipate the change of set-point due to the fact that the pneumatic response time is considerably greater than the electrical response time. This makes it possible to restore the stability of the turbine engine very rapidly.

Moreover, the invention has preferably at least one of the following optional features, taken alone or in combination.

The actuation member is a single-acting piston, and said linking means are connected to a piston rod.

Said butterfly has a general disk shape. Further shapes may nonetheless be selected, such as for example an elliptical shape, without leaving the scope of the invention. In the case of a disk, the median segment corresponds to a diameter, relative to which the axis of rotation of the disk is off-centre. In the case of an ellipse, the median segment corresponds to the minor axis or to the major axis of the ellipse. In any case, due to the off-centring thereof, the axis of rotation of the butterfly does not pass through the centre of said butterfly.

The control device comprises a pressure reducer arranged between a member for extracting air in said channel of the valve body, and a pressure chamber defined by the actuation member.

Said pressure reducer includes a torque motor to vary the pressure of the extracted air flowing from the pressure reducer.

The valve avails of information on the system status. This information may be based on a measurement made by the position sensor of the actuation member, and/or by a position sensor of the butterfly.

The invention also relates to a turbine engine module comprising a compressor as well as a butterfly bleed valve as described above, the channel of the valve body communicating with a stream of the compressor.

The invention also relates to an aircraft turbine engine comprising such a module, as well as a system for controlling the butterfly valve, this system being preferably FADEC. The turbine engine is preferentially a turboprop, but may alternatively be a double-flow and double-body turbojet. Further types of turbine engines may nonetheless be envisaged, without leaving the scope of the invention.

Finally, the invention relates to a method for controlling bleeding within a compressor of such a turbine engine, this method consisting of adjusting, within said butterfly valve, the intensity of the first pressure force applied to the actuation member and opposing said mechanical force induced by the aerodynamic torque applied to the butterfly, so as to control the opening/closure of the valve butterfly.

Further advantages and features of the invention will emerge in the non-restrictive detailed description hereinafter.

BRIEF DESCRIPTION OF THE DRAWINGS

The invention may be understood more clearly on reading the detailed description hereinafter, of non-restrictive examples of embodiments thereof, and on studying the appended drawings wherein.

DETAILED DESCRIPTION OF PREFERRED EMBODIMENTS

Figure 1:
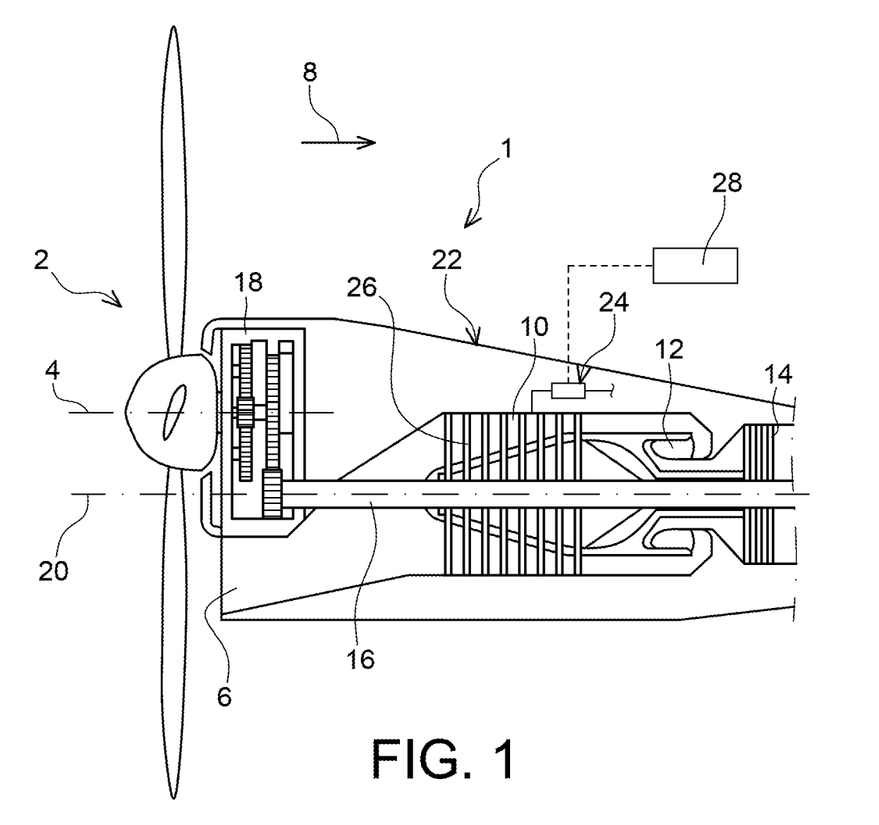
FIG. 1 represents a schematic longitudinal cross-sectional view of a turboprop comprising a butterfly bleed valve according to the invention.

With reference first of all to FIG. 1, an aircraft turboprop 1, according to the present invention, is shown. The turboprop conventionally includes a propeller 2 rotatable about an axis of rotation 4. Downstream from the propeller 2, the turboprop 1 includes an air inlet 6, situated vertically below the axis of rotation 4 of the propeller. In this regard, it is noted that throughout the description, the terms "upstream" and "downstream" are used with reference to a main direction of air flow through the propeller 2, this direction being parallel with the axis 4 and represented schematically by the arrow 8 in FIG. 1.

The air inlet 6 supplies with air a compressor or a group of compressors 10, downstream whereof a combustion chamber 12 is situated. The gases from the combustion expand in a turbine or a group of turbines 14, which actuates a drive shaft or a group of shafts 16. This shaft 16 in turn actuates a rotational speed reduction gearbox 18, the output member whereof makes it possible to rotate the propeller 2 about the axis 4 thereof. The drive shaft 16, the group of compressors 10, the compression chamber 12 and the group of turbines 14 are centred on an axis 20 parallel with the axis of rotation 4 of the propeller 2, the air inlet 6 being situated vertically below this axis 20.

The turboprop 1 includes a module 22 comprising the group of compressors 10 as well as one or a plurality of bleed valves 24 according to the invention, these valves corresponding to the conventional definition above and being capable, if applicable, of fulfilling a pressure bleed function aimed at reducing the air pressure in the compressor.

Each valve 24 communicates with a primary air stream 26 defined by the group of compressors 10. The valve 24 is connected electrically to a control device 28, which is preferably FADEC of this turboprop.

Figure 2:
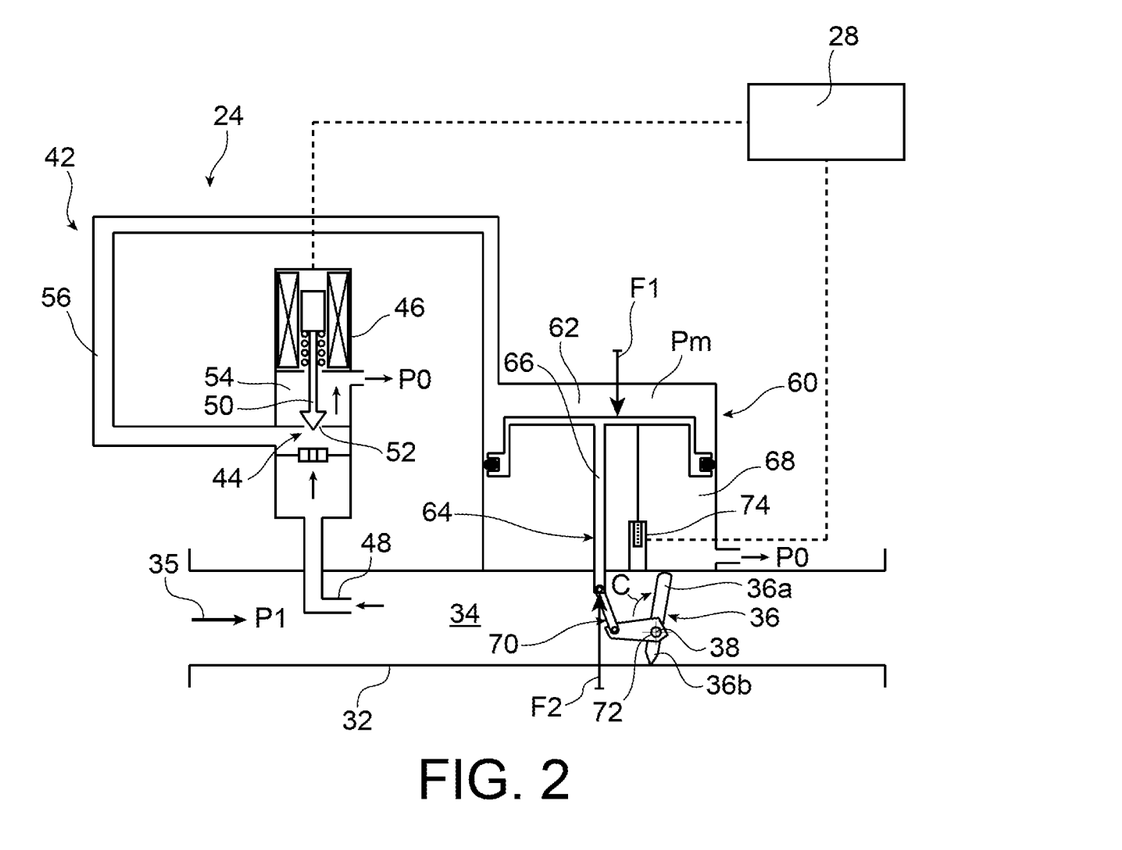
FIG. 2 represents a detailed view of the bleed valve shown in the preceding figure, according to a preferred embodiment of the invention, the valve being represented in a closed position.
Figure 3A:
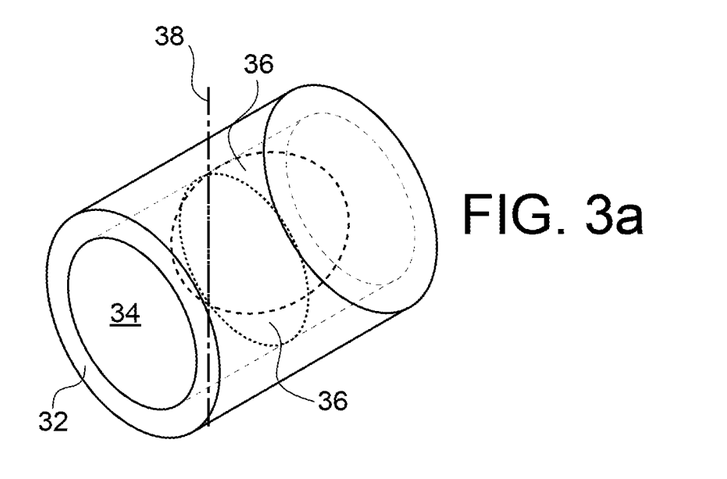
FIGS. 3a to 3c represent a plurality of separate views of a part of the valve shown in the preceding figure, specifically showing the butterfly in the valve body thereof, in various positions.
Figure 3B:
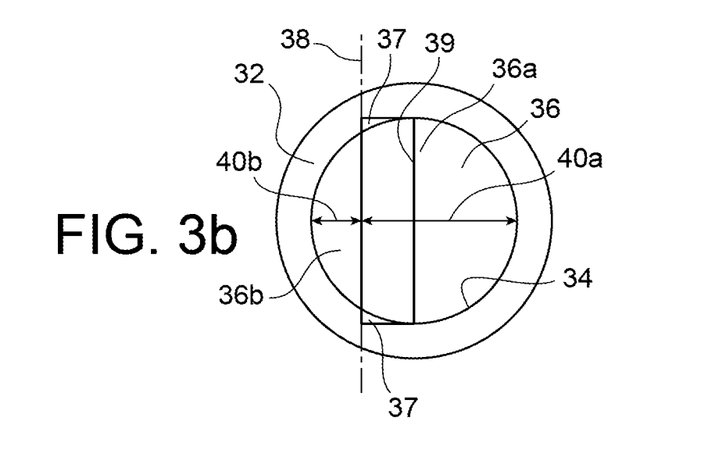
Figure 3C:
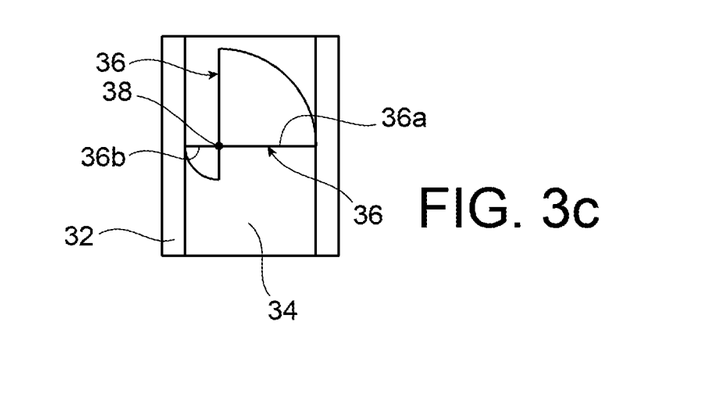

FIGS. 2 to 3c represent a preferred embodiment of the bleed valve 24, which is of the butterfly valve type. It comprises a valve body 32 defining a channel 34 through which air 35, from the compressor stream, is intended to enter. The channel 34 has a substantially circular cross-section. Within this channel, the valve 24 has a rotary closure member 36, or butterfly. The latter is rotatably mounted inside the channel 34, about an axis of rotation 38 orthogonal to the main air flow direction in said channel. The butterfly 36 has a general disk shape, of substantially identical diameter to the internal diameter of the channel 34. The arrangement of the butterfly 36 in the channel 34 is shown in various views in FIGS. 3a to 3c, in each whereof the butterfly has been represented in the closed position and in the fully open position. In the closed position, the butterfly 36 is substantially orthogonal to the axis of the channel 34, so as to completely seal the latter and prevent air flow in the downstream direction. No air flow bleed is performed in this closed position of the closure member, also corresponding to that in FIG. 2. The fully open position is offset by 90° relative to the closed position, i.e. the butterfly 36 is substantially parallel with the axis of the channel 34. In this position, the channel has a maximum flow cross-section at the closure member, enabling a significant air flow bleed. The air from the compressor stream is no longer prevented from circulating by the butterfly 36, and therefore can be discharged downstream. Obviously, intermediate positions are possible, according to the quantity of air to be discharged to limit problematic surging and separation phenomena.

One of the specificities of the invention, the effects whereof will be described hereinafter, lies in the off-centring of the axis of rotation 38 of the butterfly 36. The axis 38 is no longer arranged according to a diameter 39 of the disk, but is off-centre on the butterfly, once again being parallel therewith by passing through the thickness thereof. In FIG. 3b, the off-centring of the axis of rotation 38 relative to the diameter 39 of the disk has been clearly represented.

The off-centre axis 38 defines herein two distinct disk portions, referenced 36a and 36b. The portion 36a corresponds to the portion wherein the surface area is the most extensive (surface area greater than one half-disk), whereas the portion 36b corresponds to the portion wherein the surface area is the smallest (surface area less than one half-disk). The minimum distance between the periphery of the butterfly portion 36a and the centre of the axis of rotation 38 is referenced 40a, similarly the minimum distance between the periphery of the butterfly portion 36b and the centre of the axis of rotation 38 is referenced 40b. The ratio between these two distances 40a, 40b is set according to various parameters, and specific to each application. By way of indicative example, this ratio is not greater than 10.

To enable the rotation of the butterfly 36 despite the off-centring of the axis 38 thereof, the surface defining the channel 34 may have suitable recesses referenced 37 in FIG. 3b, these recesses 37 preventing mechanical interferences between the valve body 32 and the butterfly 36 during the pivoting of the latter.

With reference more specifically to FIG. 2, the valve 24 further includes a device 42 for controlling the angular position of the butterfly 36. The control device comprises a pressure reducer 44 equipped with a torque motor 46 controlled by the FADEC 28. The inlet of the pressure reducer 44 communicates herein with a member 48 for extracting air in the channel 34, wherein the air is presented at a pressure P1 corresponding to that of the compressor stream. This extraction member 48 takes the form of a conduit wherein one of the ends is plunged in the channel 34 of the valve body 32. Alternatively, the member 48 could extract air directly in the primary stream of the compressor, without leaving the scope of the invention.

The pressure reducer 44 has a known design, and therefore will not be described in detail. Conventionally, it is supplied with air from the channel 34 via the extraction member 48. According to the control of the torque motor 46 by the FADEC, a piston 50 seals to a greater or lesser degree an air exhaust orifice 52, to a chamber 54 open at atmospheric pressure P0. The greater the cross-section of the orifice 52 is, the higher the pressure loss, and conversely. Consequently, the position of the piston 50 determines the pressure of the air flowing from the pressure reducer 44, this outlet being performed by a conduit 56 supplying a single-acting actuation cylinder 60.

More specifically, the conduit 56 communicates with a pressure chamber 62 of the cylinder 60, this chamber being partly defined by the large face of a single-acting piston 64. In this chamber 62, the air is at an adjusted pressure Pm, the intensity whereof is controlled by the pressure reducer 44, in the manner described above.

On the other side of the piston 64, i.e. the side of the piston rod 66, the chamber 68 is opened outwards so as to be maintained at atmospheric pressure P0.

Furthermore, the end of the piston rod 66 is connected to the butterfly 36 by linking means 70, herein taking the form of one or a plurality of tie rods. These linking means 70 are on one hand hinged on the end of the piston rod 66, and on the other rigidly connected to a shaft 72 centred on the axis of rotation 38. This shaft 72 makes it possible to provide the pivoting link between the butterfly 36 and the valve body 32, wherein this shaft is inserted. This shaft 72 may be replaced by two lugs placed at the periphery of the butterfly 36, still engaging with the valve body 32.

In operation, a portion of the air from the compressor is introduced into the channel 34 at a pressure P1. A portion of the air from the primary stream or of the air from the channel 34 is extracted by the member 48 and transits via the reducer 44 wherein the pressure thereof is adjusted, until a sought pressure Pm observed up to inside the pressure chamber 62 is obtained. This pressure induces a first pressure force F1 on the large face of the single-acting piston 64. This first force F1 returns the butterfly 36 to the closed position thereof as observed in FIG. 2. Given that the value of this first pressure force F1 is dependent on the control of the pressure reducer 44, this first force F1 exhibits so-called adjustability.

Furthermore, due to the off-centring of the axis of rotation 38 of the butterfly 36, the latter is subjected to an aerodynamic torque C which tends to return same to the open position thereof. As represented schematically in FIG. 3*d*, this is due to the fact that the moment M1 applied by the air on the large butterfly portion 36*a* is greater than the moment M2 applied by the air on the small butterfly portion 36*b*.

Figure 3D:
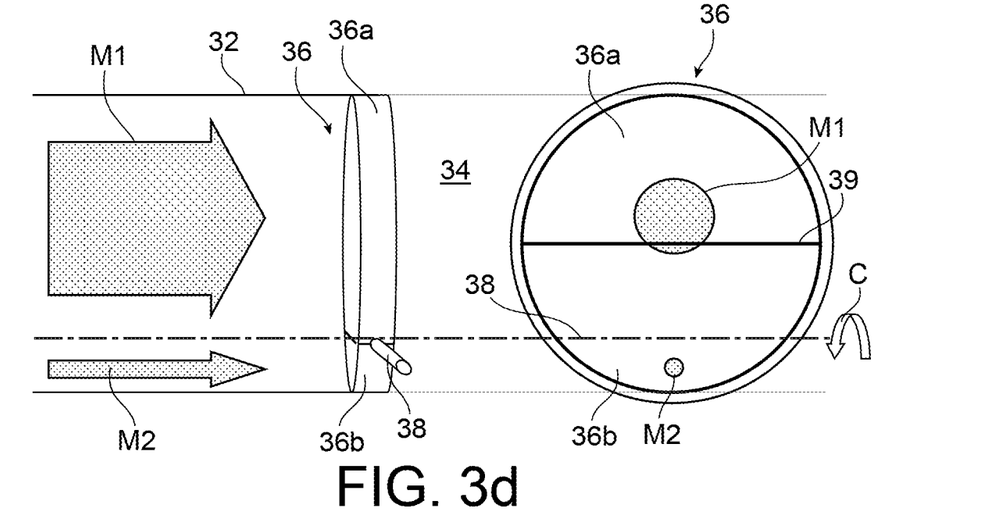
FIG. 3d is a view schematically representing the moments applied to the different portions of the butterfly.

This aerodynamic torque C different to zero is transmitted by the linking means 70 to the end of the piston rod 66, in order to generate thereon a second mechanical force F2. In addition, the position of the piston 66 and that of the butterfly 36 are determined by the resultant of the two opposing forces F1 and F2, both dependent of the pressure P1 of the air in the channel 34.

Figure 4:
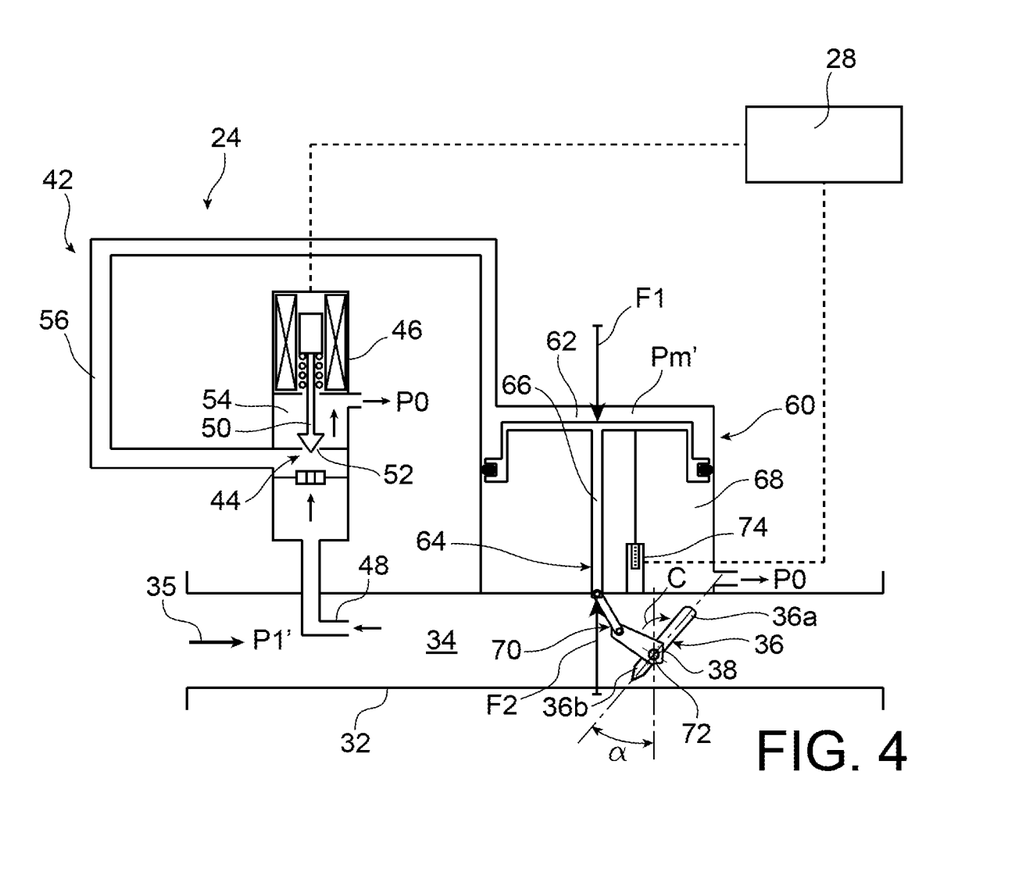
FIG. 4 is a similar view to that of FIG. 2, with the valve represented in a partially open position.

With reference now to FIG. 4, when a pressure surge P1' occurs in the channel 34, the FADEC 28 detects that it is necessary to bleed the air flow via the butterfly valve(s) 24, in order to prevent surging and separation phenomena. According to the intensity of the pressure P1', the FADEC determines the opening angle α to be adopted by the butterfly 36. Consequently, it supplies an electrical signal to the torque motor 46 in order to obtain a pressure Pm' less than the prior pressure Pm, and the intensity whereof is such that the resultant of the two opposing forces F1 and F2 moves the piston 64 to the desired position, bringing the butterfly 36 to an open position with the opening angle α sought. For this purpose, a position sensor 74 of the piston 64, and/or an angular position sensor of the butterfly (not shown) are envisaged. This may consist of a continuous measurement sensor such as for example an LVDT ("Linear Variable Differential Transformer") sensor placed on the cylinder 60, or an RVDT ("Rotary Variable Differential Transformer") sensor placed on the butterfly. The system status information could also originate from a pressure sensor positioned in the channel.

More specifically, the opening cross-section of the exhaust orifice 52 of the reducer 44 is varied from an error signal existing between the actual butterfly opening position, and the position corresponding to the set-point.

Once the target has been achieved, the two forces F1 and F2 are rebalanced by adjusting the first force F1, so as to stop the piston 64 in the desired position.

Moreover, it is noted that, in order to retain a minimum return torque on approaching the full opening position of the butterfly, the limit stop towards the opening of the control cylinder is positioned slightly before reaching this full opening.

By means of this particular design, the invention makes it possible to provide the valve 24 with increased speed, i.e. an enhanced response time throughout the turbine engine operating range. Furthermore, in the event of a pressure surge, the opening of the valve 24 is anticipated since the resulting aerodynamic torque gives rise to a very rapid increase in the second force F2, thereby inducing a suitable movement of the piston 64 by compressing the air in the chamber 62, even before the FADEC 28 has commanded a change of set-point. The invention thereby provides the bleed valve 24 with superior protection against any loss of control due to air compressibility.

With this design of the butterfly valve 24 specific to the invention, it is thereby possible to implement a method for controlling bleeding of a compressor 10 by adjusting via the FADEC 28 the intensity of the first pressure force F1 applied to the piston 64 and opposing the second mechanical force F2, induced by the aerodynamic torque C applied to the butterfly. This adjustment of the first force F1 makes it possible to control the opening/closure of the butterfly 36 of the valve 24, according to the needs encountered in terms of bleeding of the compressor. Furthermore, it is important to underline that the pneumatic return force F2 is continuously adapted to the pneumatic control force F1. Indeed, the two forces each result from air extraction on the compressor, and the variation thereof will be relatively similar. This advantageous solution contrasts with the use in the prior art of a mechanical spring, the feature is not dependent on atmospheric conditions (altitude, etc.).

Obviously, various modifications may be made by those skilled in the art to the invention described above, without leaving the scope of the disclosure of the invention. For example, the invention could be applied to a double-flow and double-box turbojet. In this scenario, each butterfly valve 24 could be arranged so as to enable air extraction between the low-pressure compressor and the high-pressure compressor, so as to discharge the air in the secondary stream of the turbojet.

What is claimed is:

1. A butterfly valve for bleeding a compressor for an aircraft turbine engine, the butterfly valve comprising a valve body defining a channel through which air from the compressor is intended to enter, a butterfly rotatably mounted inside the channel about an axis of butterfly rotation, as well as a control device for controlling angular position of the butterfly, the control device comprising a mobile actuation member connected to the butterfly by linking means, the actuation member being designed to be subjected:

to a first adjustable pressure force applied by the air from the compressor, the first adjustable pressure force returning the butterfly to a closed position; and to a second mechanical force returning the butterfly to an open position, wherein when the first adjustable pressure force is greater than the second mechanical force, then the butterfly is moved to the closed position, and when the first adjustable pressure force is less than the second mechanical force, then the butterfly is moved to the open position, and wherein the axis of butterfly rotation is off-centre relative to a median segment of said butterfly such that the air in the channel generates an aerodynamic torque on said butterfly, said aerodynamic torque inducing, via the linking means, said second mechanical force on the actuation member.

2. The butterfly valve according to claim 1, wherein the actuation member is a single-acting piston, said linking means being connected to a piston rod.

3. The butterfly valve according to claim 1, wherein said butterfly has a general disk shape.

4. The butterfly valve according to claim 1, wherein the control device includes a pressure reducer arranged between a member for extracting air in said channel of the valve body, and a pressure chamber defined by the actuation member.

5. The butterfly valve according to claim 4, wherein said pressure reducer includes a torque motor to vary the pressure of the extracted air flowing from the pressure reducer.

6. The butterfly valve according to claim 1, further comprising a position sensor of the actuation member, and/or a position sensor of the butterfly.

7. An aircraft turbine engine module comprising a compressor as well as a butterfly valve according to claim 1, the channel of the valve body communicating with a stream of the compressor.

8. An aircraft turbine engine comprising a module according to claim 7, as well as a controller for controlling the butterfly valve.

9. Turbine engine according to claim 8, wherein the turbine engine is a turboprop.

10. A method for controlling bleeding within a compressor of a turbine engine according to claim 7, the method comprising the step of adjusting, within said butterfly valve, the intensity of the first pressure force applied to the actuation member and opposing said second mechanical force induced by the aerodynamic torque applied to the butterfly, so as to control the opening/closure of the butterfly valve.

* * * * *